April 20, 1937.　　　J. PARCELL　　　2,078,095

POPCORN MACHINE

Filed Oct. 27, 1934

JOHN PARCELL.
INVENTOR.

BY *Rudolf Hildebrand*
ATTORNEY.

Patented Apr. 20, 1937

2,078,095

UNITED STATES PATENT OFFICE 2,078,095

POPCORN MACHINE

John Parcell, New York, N. Y.

Application October 27, 1934, Serial No. 750,336

5 Claims. (Cl. 53—4)

This invention concerns a machine for toasting and/or roasting pop-corn and the like.

The objects of this invention are to simplify the construction and operation of a motor-driven or a hand-operated pop-corn machine.

One particular object is to facilitate the discharge of the toasted corn in a motor driven machine. I am especially concerned in providing for means of releasing the pop-corn from a fixedly arranged toasting box. The control of the discharge of pop-corn from my toasting box is brought about by separating the box from its base, and it is my further object to provide adjustable means, which allow such separation to be brought about conveniently, gradually or quickly, and which also allow the box and base to be relatively set in a separated and an abutting position.

Figure 1:
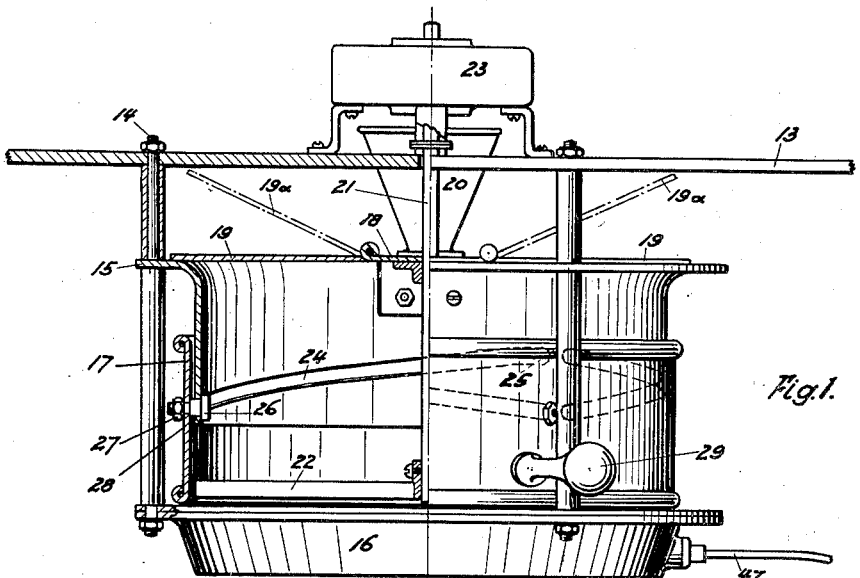

My invention may be executed in various ways in connection with the many kinds of toasting apparatus known. I therefore show two exemplary modifications which both involve my invention. The adaptation of this invention to different types of apparatus may readily be performed by those skilled in this art in conformity of the following description of those two exemplary modifications, and in the light of the exemplary drawing, in which, Fig. 1 shows a cross-sectioned detail elevation of the top part of the machine.

Figure 2:
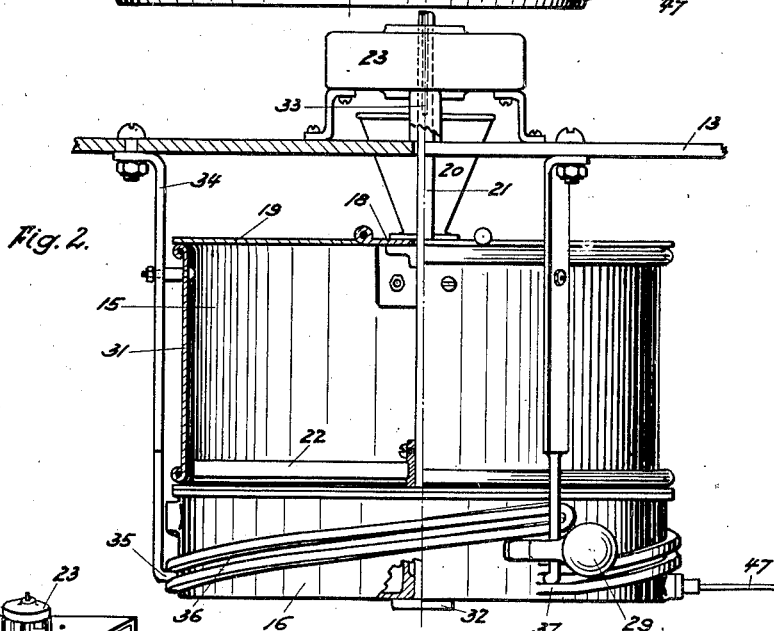

Fig. 2 shows, in a similar view, a modification.

Figure 3:
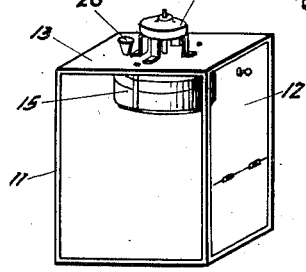

Fig. 3 gives exemplary a perspective view of the assembled apparatus.

Similar numerals refer to similar parts throughout the various views.

Electric parts, e. g. motor and heating element,—may be used in connection with this apparatus and are wired in accordance with the art, a flexible conduit being for instance used where current is supplied to a movable part.

Fig. 3 shows the enclosure 11 of the apparatus. One side wall comprises a door, which may be opened,—swung down for instance on a hinge,—in order to get at the contents of the apparatus, and in order to set the toaster.

The toaster, generally, depends from the top 13 of the apparatus. For that purpose bolts or studs 14, three of which are spaced for instance 120° apart, depend from the top 13. In the modification of Fig. 1, a flange of the toaster box 15 is fastened at a predetermined level upon said studs 14. At their lower ends the studs are fastened upon the rim of the heated toaster or plate 16, for instance a suitably encased heating element to which the current is adduced by way of cable 47. The box 15 is provided with a strip 18 extending thereacross, and upon the said strip are hinged the doors 19, which are for instance segments of a disc. As the toasted pop-corn rises, it may press the said doors 19 into open positions 19a.

Upon one side the top 13 and the strip 18 are registeringly perforated, and a funnel 20 there extends through the top 13 and through the strip 18 into the box 15, and serves to feed corn into the toaster box from the outside. Substantially centrally, through the top 13, and through the center of the box 15, extends a rotatable shaft 21, which carries at its lower end, right on top of the cover of heating element 16, suitable stirring elements, for instance the spider arms 22. The upper end of shaft 21 is coupled to a motor 23 which rotates said shaft,—e. g., by intermediate gearing which is not shown,—at a suitable stirring speed. The cylindrical wall of the toaster box 15 comprises two parts, the stationary box part, and a sleeve 17 cylindrically and slidably surrounding said part. Said sleeve 17 normally rests upon the cover of the heater element 16 in the position shown in the drawing. But there are some regularly spaced (e. g. 120°) helical slots 24 in the stationary part of box 15, which are provided at their upper ends with horizontal dwells 25. Through these slots 24, extend the shoulder screws 26. They protrude through and are fastened on the sleeve 17 by nuts 27. The shoulder parts 28 of the shoulder screws are slidably accommodated in the slots 24.

From the sleeve 17 extends a handle 29, which may be manipulated through the door 12. The handle 29 is shown to abut upon the left side of one of the rods 14, when the said handle is swung-to the left, substantially for instance up to an adjacent rod 14; then the sleeve 17 rides up, the shoulders 28 following the helical path of the slots 24, until the said shoulders slide into the dwells 25, so that then the sleeve is raised, there being a certain open space between the box 15 and the heating element 16.

The operation of the device is as follows:— The sleeve 17 is normally in its low position. Pop-corn is fed into the box 15 and is toasted by the element 16. The corn in the box will be continuously stirred by the arms 22 of the revolving shaft 21. As the corn pops and increases in volume, it may overlow over the top of the box, lifting the doors 19. After the toasting has been finished the operator swings the handle 29 to the left thereby opening the lower part of the box and the revolving stirring arms 22 will push the corn off the cover of the heating element 16, and the pop-corn will drop and be discharged into the lower part of the enclosure 11. By swinging the handle 29 to the right the box may be closed again for the next toasting operation.

Instead of lifting up a lower extension of the box, the sleeve 17, after the corn has been toasted, I may also drop the heating element, the toasting box proper remaining stationary in all instances.

Such an arrangement is shown in Fig. 2. In this instance the box 15 is provided with a continuous cylindrical wall 31, which is upwardly closed by doors 19 hinged upon a strip 18, in a manner equivalent to that illustrated in Fig. 1. In this instance the stirring member, with the arms 22, is again fastened upon the shaft 21, but the shaft is shown to extend through the heating element 16, and is thrustwise, but rotatably, fixed relatively to the heating element 16 by means of a collar 32 provided upon the lower end of shaft 21. The upper end of shaft 21 is shown to be engaged by a feather keyway 33 upon the motor so that the shaft 21 may be raised and lowered, but still remains operatively engaged upon the motor 23.

The raising and lowering of the bottom plate or heating element 16, is brought about by an arrangement analogous to the means used for raising and lowering the lower part of the toasting box of Fig. 1, sleeve 17. The lower ends of the straps 34, which are spacedly fastened upon the top 13 of the enclosure, and which retain the box 15 and more particularly its cylindrical walls at a fixed distance from the top 13, are engaged upon helical grooves provided upon the circumference of plate or element 16. This is brought about by turning over the lower ends 35 of straps 34 and said turned-over ends 35 slidably extend into the grooves 36 provided upon the circumference of the plate or element 16. The grooves 36 are exemplarily shown to be disposed between helical teeth extending from the plate or element 16, and these grooves are provided with dwells 37 at their lower ends, in analogy to the dwells 25 at the upper ends of slots 24 in Fig. 1. The turned-over ends or hooks 35 at the lower ends of straps 34 are shown to be engaged upon the dwells 37 of the grooves 36 in the position shown. By swinging the handles 29 to the left the element or plate 16 is lowered and thus moved away from the box. By swinging the element 16 to the right I close the box again. The stirrer 22, being thrustwise bound upon the heating element 16 by the collar 32, will always remain in a fixed vertical position relatively to the element 16, the shaft 21 sliding up and down in the motor by way of the feather key-way 33, when the element 16 is raised and lowered. Said shaft also vertically slides through or it clears the strip 18, and the top 13, when it is thus moved.

Although I have shown and described one form of embodiment of my invention in detail, yet I do not wish to be limited thereby, except as the state of the art and the appended claims may require, for it is obvious that various modifications and changes may be made in the form of embodiment of my invention, without departing from the spirit and scope thereof.

I claim:

1. In a pop-corn machine, a bell-shaped toasting box, a heater spacedly arranged relatively to said box, and a sleeve slidable on said box onto and away from said heater.

2. In a pop-corn machine, an enclosure, a toasting box fixedly mounted in said enclosure, a hot plate mounted below said enclosure, and an extension on said box and movable on said box onto and away from said hot plate.

3. In a pop-corn machine, an enclosure, a toasting box fixedly mounted in said enclosure, a hot plate mounted below said enclosure, and an extension on said box and means reciprocating said extension relatively to said plate.

4. In a pop-corn machine, an enclosure, a toasting box fixedly mounted in said enclosure, a hot plate mounted below said enclosure, and an extension on said box and means helically guiding said extension on said box, so that its distance relatively to the plate is regulated by a rotation of said extension.

5. In a pop-corn machine, an enclosure, a toasting box fixedly mounted in said enclosure, a hot plate mounted below said enclosure, helical slots in said box, a sleeve slidable on said box and engaged upon said slots, and means shifting said sleeve along said slots, so that it is moved onto or away from said plate.

JOHN PARCELL.